(No Model.)

R. & J. BARLASS.
FORK FOR CAKES.

No. 416,250. Patented Dec. 3, 1889.

Witnesses.
C. N. Keeney
Anna Faust.

Inventors.
Robert Barlass
John Barlass
By Ermin & Benedict
Attorneys.

UNITED STATES PATENT OFFICE.

ROBERT BARLASS, OF HARMONY, AND JOHN BARLASS, OF JOHNSTOWN, WISCONSIN.

FORK FOR CAKES.

SPECIFICATION forming part of Letters Patent No. 416,250, dated December 3, 1889.

Application filed February 26, 1889. Serial No. 301,209. (No model.)

*To all whom it may concern:*

Be it known that we, ROBERT BARLASS, of Harmony, and JOHN BARLASS, of Johnstown, in the county of Rock and State of Wisconsin, have invented a new and useful Cake-Fork; and we do hereby declare the following to be a full, clear, and exact description of said invention, reference being had to the accompanying drawings, and to the letters of reference marked thereon, which form a part of this specification.

Our device is intended and adapted especially as an implement for elevating and removing pieces of cake or similar material from the plate, on which the whole cake cut into pieces is served, to individual plates, or for similar use.

Figure 1:
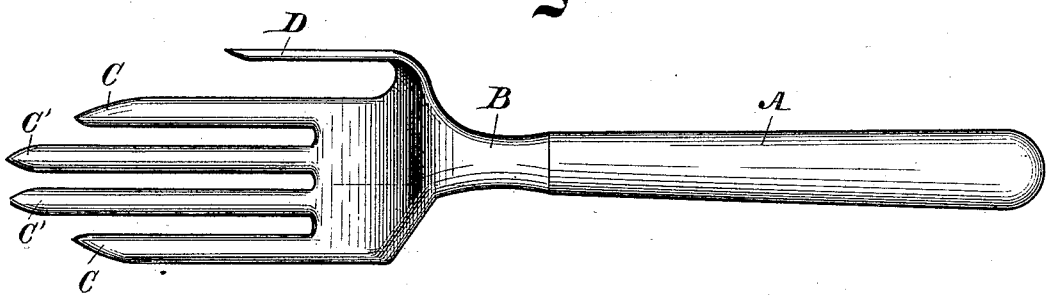
Figure 2:
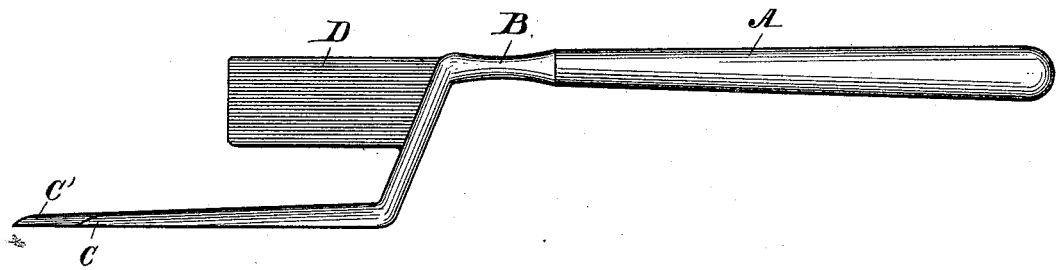
Figure 3:
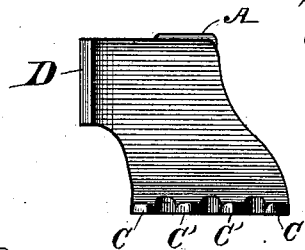

In the drawings, Figure 1 is a perspective view of the complete device. Fig. 2 is a view of the same device nearly at right angles to the view shown in Fig. 1. Fig. 3 is a front end view of the fork, showing the shank principally.

The complete fork consists of a handle A, a shank B, several tines C C C' C', and a guard-arm D. All the parts are preferably made of metal and integral with each other; but the handle may be made separately, if preferred. The shank B is turned down a short distance at nearly right angles to the handle, and is widened somewhat laterally, as shown in Fig. 3. The tines C C C' C' extend forwardly from the shank nearly parallel with an extended line of the handle, and the two middle tines C' C' are preferably made somewhat longer than the outside tines C C. If fewer or more tines than four are used, as there may be, their relative lengths may be made as desired; but we prefer four tines, the two middle ones made longer than the outside ones, as shown in the drawings, which form is well adapted for removing pieces of cake of the well-known wedge shape into which large round cakes are commonly cut. The arm D projects forwardly from the upper part of the shank B, and is somewhat flattened vertically, whereby it is adapted to serve as a guard or bearing against one side of the piece of cake when held on the fork.

What we claim as new, and desire to secure by Letters Patent, is—

1. A fork consisting of a handle A, a downwardly-bent shank B, and tines C, in combination with a guard-arm D, projecting forwardly from the side of the shank, substantially as described.

2. A fork consisting of a handle A, a widened and downwardly-bent shank B, a series of tines, the central one or ones being longer than the side ones, in combination with a vertically-flattened and forwardly-extending guard-arm D, integral with the shank B, substantially as described.

In testimony whereof we affix our signatures in presence of two witnesses.

ROBERT BARLASS.
JOHN BARLASS.

Witnesses:
JOHN CUNNINGHAM,
T. ST. JOHN.